US012156214B2

(12) United States Patent
Wu

(10) Patent No.: US 12,156,214 B2
(45) Date of Patent: Nov. 26, 2024

(54) AUTOMATIC FREQUENCY COORDINATION WITH RESIDENTIAL GATEWAY ACCESS POINTS

(71) Applicant: CHARTER COMMUNICATIONS OPERATING, LLC, St. Louis, MO (US)

(72) Inventor: Deh-Min Richard Wu, Centennial, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 275 days.

(21) Appl. No.: 17/749,307

(22) Filed: May 20, 2022

(65) Prior Publication Data
US 2023/0379911 A1    Nov. 23, 2023

(51) Int. Cl.
*H04W 72/20*   (2023.01)
*H04W 60/04*   (2009.01)
*H04W 64/00*   (2009.01)
*H04W 84/18*   (2009.01)

(52) U.S. Cl.
CPC ........... *H04W 72/20* (2023.01); *H04W 60/04* (2013.01); *H04W 64/003* (2013.01); *H04W 84/18* (2013.01)

(58) Field of Classification Search
CPC ... H04W 60/04; H04W 64/003; H04W 72/20; H04W 84/18
See application file for complete search history.

(56) References Cited

U.S. PATENT DOCUMENTS

| 8,831,625 | B2  |   | 9/2014  | Joslyn et al. |
| 9,681,307 | B2  |   | 6/2017  | Taher et al. |
| 10,568,104 | B2 | * | 2/2020  | Amanna ................ H04W 72/54 |
| 2023/0413189 | A1 | * | 12/2023 | Wang ................ H04W 72/0453 |

FOREIGN PATENT DOCUMENTS

WO    2021050957 A1    3/2021

OTHER PUBLICATIONS

"Automated Frequency Coordination: An Established Tool for Modern Spectrum Management", DSA DB-Report Final, Mar. 2019.
"Automated Frequency Coordination: An Established Tool for Modern Spectrum Management", DAS Event Handout, http://dynamicspectrumalliance.org/wp-content/uploads/2019/03/DSA_DB-Report_Final_03122019.pdf, Mar. 2019.
FCC Fact Sheet "Unlicensed Use of the 6 GHz Band; Notice of Proposed Rulemaking," ET Docket No. 18-295, GN Docket No. 17-183, Oct. 2, 2018, 48 sheets.
FCC Fact Sheet "Unlicensed Use of the 6 GHz Band; Report and Order and Further Notice of Proposed Rulemaking,"ET Docket No. 18-295, GN Docket No. 17-183, Apr. 2, 2020, 125 sheets.

* cited by examiner

*Primary Examiner* — Brian P Cox
(74) *Attorney, Agent, or Firm* — Patent Beach PC

(57) ABSTRACT

Various embodiments are directed to methods, apparatus, systems, architectures, mechanisms and apparatus providing a local, self-organizing, and automatic unlicensed channel(s) exclusion enforcement mechanism wherein a frequency coordination (AFC) function at a network device associated with an access point (AP), such as a home/business gateway including an AP.

20 Claims, 3 Drawing Sheets

AUTOMATIC FREQUENCY COORDINATION WITH RESIDENTIAL GATEWAY ACCESS POINTS

FIELD OF THE DISCLOSURE

The present disclosure generally relates to wireless communications systems and related networks, and more particularly to mechanisms for an in situ automatic frequency coordination (AFC) function configured to provide local unlicensed channel exclusion such as at gateway access points.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

The United States Federal Communications Commission (FCC) has adopted new rules for the 6 GHz radio frequency (RF) band, releasing an additional 1,200 MHz of spectrum for unlicensed low-power devices/use. The FCC also modernized the use of the 5.9 GHz band by making the lower 45 megahertz of the band (5.850-5.895 GHz) available for unlicensed uses like Wi-Fi (e.g., IEEE 802.11xx) and re-allocating the upper 30 megahertz of the band (5.895 GHz-5.925 GHz) to the modern Cellular Vehicle-to-Everything (C-V2X) technology. In order to protect the existing 6 GHz, the new WiFi APs (Access Points) used for outdoor shall only be deployed when there is no interference to the licensed usage. The AP is 6 GHz capable and can support UNII-5 to -8 in 1200 MHz spectrum between 5.925-7.125 GHz. Indoor use is not regulated since the interference is low to licensed service. Outdoor unlicensed usages require AFC.

SUMMARY

Various embodiments are directed to methods, apparatus, systems, architectures, mechanisms and apparatus providing a local, self-organizing, and automatic unlicensed channel(s) exclusion enforcement mechanism wherein a frequency coordination (AFC) function at a network device associated with an access point (AP), such as a home/business gateway including an AP. Upon initialization (and periodically thereafter) the AFC function automatically interrogates an FCC universal licensing system (ULS) to identify assigned (unavailable) 6 GHz band unlicensed band channels, uses AP capabilities to measure channel quality and select "best" quality channel(s), interact with network services provider server/database to verify the AP location register AP to use channels or spectral portions thereof at full or partial power levels is such registration does not conflict with prior AP registrations or incumbent/priority users.

In one embodiment, an automatic frequency coordination (AFC) method for managing frequency grants to a Wi-Fi access point (AP) comprises: (1) determining the location of the AP; (2) transmitting toward a Federal Communications Commission (FCC) universal licensing system (ULS) a query to identify allocations of any 6 GHz band channels within a geographic region proximate the determined AP location; (3) responsive to an indication that some of the proximate 6 GHz band channels are allocated, transmitting toward the FCC ULS a query to identify allocations of a subset of the 6 GHz band channels of the prior query; (4) selecting at least one unallocated 6 GHz band channel exhibiting a high quality signal, and transmitting toward a network manager a registration request identifying the determined AP location and the at least one selected channel; (5) responsive to a registration response indicating that the determined AP location is incorrect, updating the location of the AP and repeating steps (2) through (5); (6) responsive to a registration response indicating that none of the at least one selected channels may be used by the AP, repeating steps (2) through (6); (7) responsive to a registration response assigning 6 GHz band channel frequencies to the AP, configuring the AP to operate using the assigned 6 GHz band channel frequencies for a predefined amount of time.

Additional objects, advantages, and novel features of the invention will be set forth in part in the description which follows, and will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1:
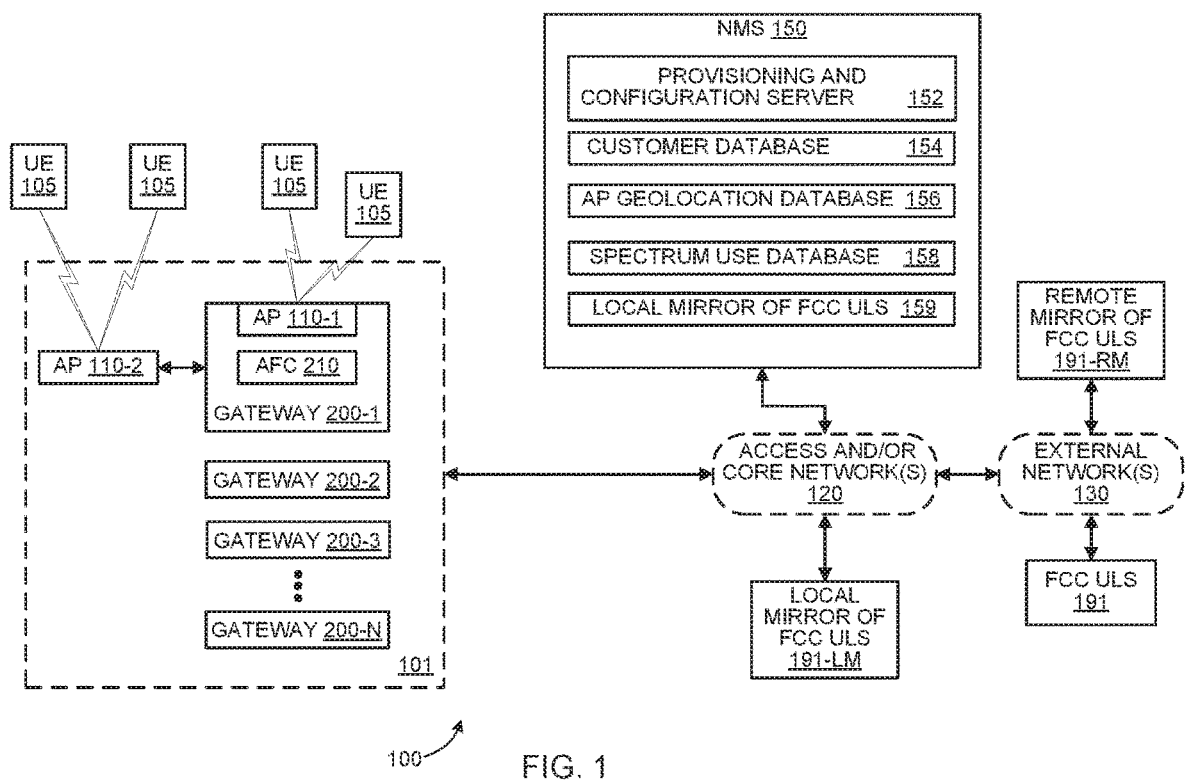
FIG. 1 depicts a block diagram of a network services architecture suitable for use in illustrating the various embodiments.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Various embodiments provide a local, self-organizing, and automatic unlicensed channel(s) exclusion enforcement mechanism wherein an automatic frequency coordination (AFC) function at a network device associated with an access point (AP), such as a home/business gateway including an AP. Upon initialization (and periodically thereafter) the AFC function automatically interrogates an FCC universal licensing system (ULS) to identify assigned (unavailable) 6 GHz band unlicensed band channels, uses AP capabilities to measure channel quality and select "best" quality channel(s), interact with network services provider server/database to verify the AP location register AP to use channels or spectral portions thereof at full or partial power levels is such registration does not conflict with prior AP registrations or incumbent/priority users.

FIG. 1 depicts a block diagram of a network services architecture suitable for use in illustrating the various embodiments. Specifically, FIG. 1 depicts a network 101 of gateways 200-1 through 200-N (collectively gateways 200) comprising, e.g., customer premises equipment (CPE) such as deployed to residential or business customers of a network services provider (operator), illustratively an Internet Service Provider, a telecommunications company, or a Multi-Service Operator (MSO). Each of the gateways 200 is associated with and supports at least one wireless access point (AP) 110 configured to wirelessly provide network services to user equipment (UE) 105 attached thereto, such as in accordance with Wi-Fi (IEEE 802.11xx) and related protocols. As depicted in FIG. 1, a first gateway 200-1 including a built-in AP 110-1 is also configured to support an external AP 110-2. The various gateways may include support for either or both of built-in and external APs 110.

As depicted in FIG. 1, the gateways 200 are in communication with various provider equipment (PE) associated with access and/or core networks 120, such via a backhaul network (illustratively, respective local cable modems (CMs), which in turn communicate with neighborhood cable modem termination systems (CMTSs), which in turn communicate with various access network elements as is known). The access and/or core networks 120 are depicted as communicating with external networks 130 such as the Internet, an IP Multimedia Core Network Subsystem (IMS), or any other type of external network.

The APs 110 may comprise wireless devices such as wireless routers, interface devices, and the like implemented as wireless access points such as deployed at home, business or other locations and configured to wirelessly communicate with and provide network services to UE 105 such as via the 802.11 Wi-Fi protocols using unlicensed spectrum such as described herein.

UE 105 receives network services (e.g., voice, streaming media, data upload/download etc.) via the APs 110, such as illustratively provided by a remote server (not shown) coupled to the external networks 130 and communicating therethrough with the access and/or core networks 120 and backhaul networks. The UE 105 may comprise any type of endpoint device with WiFi capability and configured for use in accordance with the various embodiments, such as a mobile handset, laptop, tablet, smart devices such as at homes, machine devices, sensors and the like capable of communicating with an AP 110. As such, the term UE should not be narrowly construed.

As depicted in FIG. 1, the various backhaul, access and core networks 120 handle user data or data plane (DP) functions, such as transporting internet protocol (IP) data traffic (i.e., incoming and outgoing IP packets) between the User Equipment (UE) 105 (via an AP 110) and the external networks 130, handling control plane signaling, and performing various functions as is known.

In various embodiments, a network management system (NMS) 150 cooperates with the access and/or core networks 120, as well as the backhaul networks, to perform various network management functions, such as network optimization, congestion monitoring, session monitoring, and so on as is known.

As depicted in FIG. 1, the NMS 150 includes various elements configured to perform various control and processing operations in accordance with the embodiments, such as a provisioning and configuration server 152, a customer database 154, an AP geolocation database 156, and a spectrum use database 156.

The provisioning and configuration server 152 performs various provisioning and configuration functions associated with the gateways 200 and APs 110 within the network 101, such as with respect to the AFC 210 functions discussed herein and below. The provisioning and configuration server 152 keeps track of all the 6 GHz channels/frequencies in use by the various APs 110 within the network 101 so as to use these 6 GHz channels/frequencies in an efficient manner, and without impacting priority/incumbent users. The provisioning and configuration server 152 stores data indicative of the assigned 6 GHz channels/frequencies in use by the various APs 110 within the network 101 in the spectrum use database 158.

As depicted in FIG. 1, the access point (AP) geolocation database 156 is used to store geolocation data associated with the various APs 110 within the coverage area or footprint of the network 101 (more generally, the APs 110 associated with the relevant network operator or ISP). The AP geolocation database 156 may be periodically updated by other PE management entities (not shown). The correct address of the customer, and particularly the APs 110 of a customer, is used by the AFC 210 to determine whether none, some, or all of the 6 GHz sub-band channels may be used by AP 110 at that location. The AP geolocation database should generally reflect AP locations that conform to customer service addresses such as stored in the customer database 154. Discrepancies in this location data are resolved by the provisioning and configuration server 152. Such may require repeat or further AFC 210 processing to identify suitable 6 GHz sub-band frequencies for use by an AP 110 with incorrect location information.

Generally speaking, the AFC 210 communicates with an FCC Universal Licensing System (ULS) 191 (e.g., via access/core networks 120 and external networks 130) with geographic search queries to retrieve therefrom frequency/channel allocation information about the relevant AP coverage area. When there is any returned licensed band/channel under active service, the AFC blocks AP use of those same channels.

In various embodiments, the FCC ULS 191 may comprise an entity resident on an FCC server or other FCC controlled system that is accessed in accordance with the various embodiments via a uniform resource locator (URL) or other mechanism.

In various embodiments, the FCC ULS 191 may comprise an entity resident on a third party or local non-FCC server or system mirror, such as a remote mirror 191-RM (i.e., outside of the network provider's access network) or a local mirror 191-LM (i.e., within the network provider's access network) of a source FCC server or other FCC controlled system that is periodically updated, and that is accessed in accordance with the various embodiments via a uniform resource locator (URL) or other mechanism. The local mirror 191-LM and/or remote mirror 191-RM may be implemented in a data center (e.g., cloud based mirror) or within server equipment within the NMS 150 or networks 120.

The AFC 210 may comprise a hardware component of a software component implemented in hardware such as within a gateway 200, AP 110, or other device so as to confirm FCC allowed use.

The AFC 210 may include a global positioning system (GPS) receiver to provide accurate location information to ensure that the correct location of an AP 110 is known and used when identifying potential 6 GHz sub-band portions to be used by the AP. Automated registration of gateway location for indoor use may simply include the use of a customer address. Automated registration of gateway location for outdoor use may include the use of a customer address and/or coordinates.

Various embodiments further utilize proactive channel scanning and conflict identification/resolution using features from one or both of the AP 110 and gateway 200.

The AFC software component communicates with an FCC Universal Licensing System (ULS) with geographic search criteria to retrieve the frequency information about the AP coverage area already allocated by any other licensed service, and interfaces with the AP so as to responsively manage the frequency allocation for the AP by either (1) blocking any AP use of FCC-returned licensed band/channel under active service (e.g., with other devices/APs), or (2) reducing power such as for indoor use.

The registration is automated by the AFC and is optionally audited, logged and process-monitored by the NMS 150. The following options are for registration: (1) re-register with a new address; (2) register with the same address; (3) de-register from AFC service; (4) register with the same or different spectrum usage; and (5) register with the same or different transmit output power.

In some embodiments, the provisioning and configuration server 152 receives registration requests from the AFC 210 of gateways 200 indicative of AP 110 location as well as specific channels or frequencies identified by the AFC 210 as available and selected for use by the AP 110. If the location information is incorrect, or the selected channels/frequencies are not available, then the provisioning and configuration server 152 will reject the registration request. Otherwise, some or all of the frequencies associated with the requested channel(s) will be registered for use by the AP 110 associated with the requesting gateway 200. That is, the server 152 rejects a request consistently due to an issue such as, illustratively, incorrect AP location data, frequency occupied, and so on. A response may propose an AP to re-register with one or more available frequencies in the same or different band.

The various embodiments discussed herein contemplate "smart" gateway devices 200 including or associated with Wi-Fi (802.11xx) access points (APs) 110 capable of using some of all of the relevant 6 GHz band in coordination with 6 GHz existing (priority) licensed services such as satellite services, TV and broadcast services, which are to be protected from interference by such unlicensed usage (See, e.g., FCC-CIRC2004-01). To protect the priority/incumbent (licensed) services, the various embodiments use an automatic unlicensed channel(s) exclusion enforcement mechanism comprising an automatic frequency coordination (AFC) function or module 210 instantiated or otherwise invoked at a network device associated with an access point (AP), such as a home/business gateway 200 including or associated with an AP 110, wherein under AFC priority/incumbent users of the 6 GHz sub-bands of 5.925-6.425 GHz and 6.525-6.875 GHz are protected from such unlicensed use. Therefore, at least some of these APs 110 are 6 GHz capable and can support UNII-5 to -8 in 1200 MHz spectrum between 5.925-7.125 GHz.

Generally speaking, as will be discussed below in more detail, upon initialization (and periodically thereafter) of the gateway 200 the AFC function 210 automatically interrogates an FCC universal licensing system (ULS) to identify assigned (unavailable) 6 GHz band unlicensed band channels, uses AP capabilities to measure channel quality and select "best" quality channel(s), interact with network services provider server/database to verify the AP location register AP to use channels or spectral portions thereof at full or partial power levels is such registration does not conflict with prior AP registrations or incumbent/priority users.

For example, the FCC ULS query may be periodically transmitted in accordance with a channel assignment timer to provide thereby periodic verification of allocations of any 6 GHz band channels within a geographic region proximate the determined AP location. A configurable channel assignment timer may be used to cause this verification to occur daily or more frequently, such as in response to an indication of a licensed user updating their usage more frequently than once a day, an indication of network deployment updating more frequently than once a day, or some other indication that a more frequent verification is appropriate. The frequency of the verification may be proportional to the frequency of the indicated condition triggering a change in periodicity of verification.

Various elements or portions thereof depicted in FIG. 1 and having functions described herein are implemented at least in part as computing devices having communications capabilities, including for example the UE 105, APs 110, gateways 200, AFC 210, access and/or core networks 120, NMS 150, and various other elements as described herein. These elements or portions thereof have computing devices of various types, though generally a processor element (e.g., a central processing unit (CPU) or other suitable processor (s)), a memory (e.g., random access memory (RAM), read only memory (ROM), and the like), various communications interfaces, input/output interfaces and the like.

As such, the various functions depicted and described herein may be implemented at the elements or portions thereof as hardware or a combination of software and hardware, such as by using a general purpose computer, one or more application specific integrated circuits (ASIC), or any other hardware equivalents or combinations thereof. In various embodiments, computer instructions associated with a function of an element or portion thereof are loaded into a respective memory and executed by a respective processor to implement the respective functions as discussed herein. Thus, various functions, elements and/or modules described herein, or portions thereof, may be implemented as a computer program product wherein computer instructions, when processed by a computing device, adapt the operation of the computing device such that the methods or techniques described herein are invoked or otherwise provided. Instructions for invoking the inventive methods may be stored in tangible and non-transitory computer readable medium such as fixed or removable media or memory, or stored within a memory within a computing device operating according to the instructions.

Figure 2:
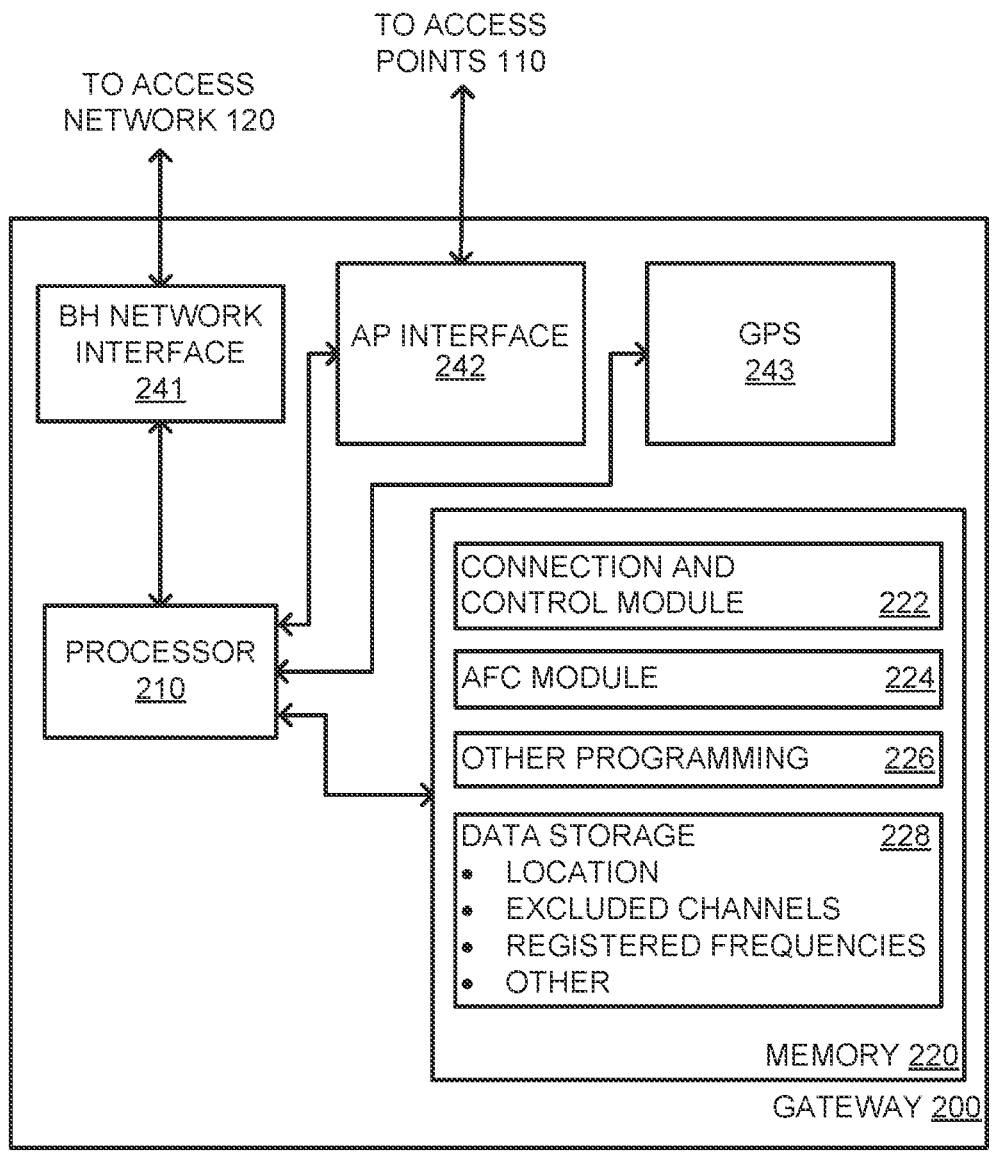
FIG. 2 depicts block diagram of an exemplary gateway suitable for use in the network services architecture of FIG. 1.

FIG. 2 depicts block diagram of an exemplary gateway suitable for use in the network services architecture of FIG. 1. Specifically, the gateway 200 of FIG. 2 is depicted as including one or more processor(s) 210, a memory 220, a backhaul network interface/transceiver 241, an access point (AP) interface/transceiver 242, and an global positioning system (GPS) receiver 243 or other receiver suitable for processing location data such as associated with a Global Navigation Satellite System (GNSS) or other location indicative means.

The processor(s) 210 is coupled to, and adapted to cooperate with, the memory 220, the communications interfaces/transceivers 241-242, the GPS receiver 243, as well as various other support circuitry (not shown) to provide the various functions as described herein with respect to the gateway 200, APs 110 and the like.

Memory 220 includes random access memory (RAM), read only memory (ROM), and/or flash memory, and stores information in the form of data and instructions. These instructions that can be executed by processor(s) 210. Various types of instructions may be stored in memory 220. For instance, memory 220 may store instructions that control the operation of communication interfaces/transceivers 241-242, the GPS receiver 243, the various AFC functions disclosed and discussed herein with respect to the figures, as well as the operation of other elements within the gateway 200 (not shown).

The BH interface 241 as depicted herein are configured to support backhaul communications with the access/core networks 120.

The access point (AP) interface/transceiver 242 as depicted herein is configured to support communications with one or more APs 110.

The GPS receiver 243 is configured to receive and process GPS location information or similar information from a satellite-based location system.

The memory 220, generally speaking, stores programs, data, tools and the like that are adapted for use in providing various functions as described herein with respect to the figures. For example, the memory 220 is depicted as storing instructions associated with a connection and control module 222, an AFC module 224, other programming 226, as well as data storage 228 (including storage for AP location information, excluded 6 GHz channels, AP-registered frequencies, and various other information), which instructions cause the respective modules either individually or in combination to perform the various functions of the embodiments described herein. The memory 220 stores instructions controlling the transmission and reception of data via the various interfaces 241-242 in accordance with the appropriate communications protocols, data and control formats, timing requirements, packet structures and the like.

Generally speaking, the gateway 200 implemented as described herein interacts with APs 110, NMS 150, and FCC ULS 191 to perform the various functions described herein with respect to the embodiments.

Figure 3:
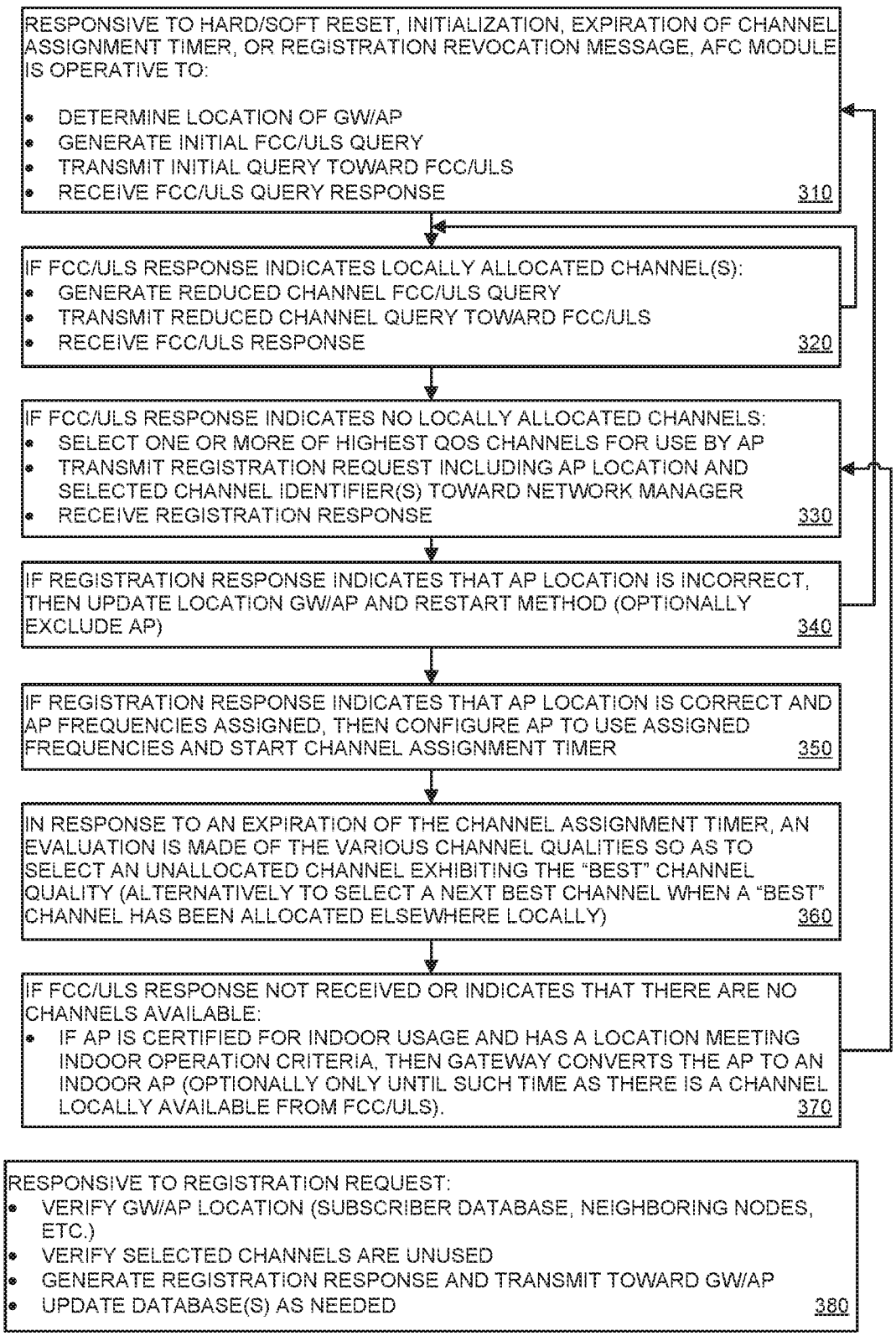
FIG. 3 depicts a flow diagram of an automatic frequency coordination (AFC) method according to an embodiment.

FIG. 3 depicts a flow diagram of an automatic frequency coordination (AFC) method according to an embodiment. Specifically, the method 300 of FIG. 3 generally depicts AFC functions and AFC interactions directed to enforcing the exclusion of AP 110 from using 6 GHz band channels where such channels are allocated to priority/incumbent use.

At step 310, responsive to a hard reset (e.g., power cycle), soft reset, initialization, expiration of a channel assignment timer, or registration revocation message, the AFC module 210 is operative to: determine the location of the gateway 200, specifically the AP 110 associated with the gateway 200, generate an initial FCC/ULS query, transmit initial query toward the FCC/ULS 191, and subsequently receive an FCC/ULS query response. The initial query may comprise a location-based query as to whether the AP 110 location is associated with the allocation of any 6 GHz band channels/frequencies to incumbent/priority users.

At step 320, if the FCC/ULS response indicates that there are locally allocated channel(s), then the AFC module 210 is operative to: generate a reduced channel FCC/ULS query, transmit the reduced channel query toward the FCC/ULS 191, and subsequently receive an FCC/ULS query response. The reduced channel FCC/ULS query may comprise a location-based query as to whether the AP 110 location is associated with the allocation of any specific 6 GHz band sub-bands, channels/frequencies, and/or ranges thereof to incumbent/priority users.

Step 320 may be repeated multiple times as appropriate.

At step 330, if the FCC/ULS response indicates that there are no locally allocated channel(s) from the prior query, then the AFC module 210 is operative to: select one or more of highest QoS channels for use by the AP 110, transmit a registration request including AP location, maximum transmission power and selected channel identifier(s) toward the network manager, and subsequently receive a registration response.

At step 340, if the registration response indicates that the AP location is incorrect, then AP location is updated at the gateway or AP and the method is restarted at step 310. Similarly, if no channels/frequencies are assigned to the requesting AP, the method is restarted at step 310. Optionally the AP is excluded from the service temporarily and the customer and the operational team are notified by a correspondence (e.g. email, text message) from the NMS about the inconsistency of customer's gateway deployment. Customer and operator's support team, and automatic management system can resolve the location information conflict. As an example procedure that a customer/operational team are notified by the NMS with currently stored NMS location and the AFC register requested location difference, they need to determine the correct location data. As the correct location data is provided to the NMS, the register response will include this location data in the response for AFC future usage.

At step 350, if the registration response indicates that the AP location is correct, and the AP has been registered by the NMS 150 and assigned to use one or more of the queried AP channels/frequencies, then the AFC module 210 causes the AP to be configured to use the assigned channels/frequencies and a channel assignment timer is started (e.g., a 24 hour timer, 12 hour timer, 6 hour timer, or other configurable duration timer). The amount of time associated with the channel assignment timer should be consistent with a minimum amount of time where an incumbent user will not need the assigned channels/frequencies.

At step 360, in response to an expiration of the channel assignment timer, an evaluation is made of the various channel qualities so as to select an unallocated channel exhibiting the "best" channel quality, alternatively to select a next best channel when a "best" channel has been allocated elsewhere locally. Further, while sequentially presented in FIG. 3, it is noted that steps 310-350 may be performed in parallel with step 360 to provide thereby an available channel list.

At step 370, if the FCC/ULS response is not received indicates that there are no channels available, and the AP is certified for indoor usage and has a location meeting indoor operation criteria, the gateway converts the AP to an indoor AP (optionally until such time as there is a channel locally available from FCC/ULS). Further, proceeding to step 330, the AFC module 210 is operative to: select one or more of the highest QoS channels for use by the AP, and to transmit a registration request including AP location and selected channel identifier towards network manager. The registration indicating that the AP transmits low-power indoor with an allowed maximum output power for next configurable time period (e.g., EIRP less than 24 dBm subject FCC regulation certification rules).

An exemplary operation of the NMS 150 responding to the registration request of step 340 is provided at step 380. Specifically, at step 380, in response to the NMS 150 (e.g., provisioning and configuration server 152) receiving the registration request transmitted by the AFC 210 at step 340, the NMS 150 is operative to: verify the gateway/AP location (e.g., using the customer database 154, AP geolocation database 156, neighbor node reports, and/or other means), verify that the selected channels in the request are unallocated and unused, generate a registration response as appropriate, transmit the registration response toward the requesting AFC, and updated the NMS database(s) as appropriate. The registration response indicates whether the AP locations is accurate, and whether any channels/frequencies have been assigned by the NMS 150 to the requesting AP 110. The response may further include proposed alternate/available frequencies for consideration by the AP.

As discussed above, specific 6 GHz band channel/frequencies may be selected due to that channel exhibiting a high quality signal. Further, where the bandwidth associated with expected UE traffic or other traffic exceeds that which is reasonably available in a single 6 GHz band channels/frequencies, various embodiments contemplate that multiple 6 GHz band channels/frequencies may be selected. For example, two or more 6 GHz band channels/frequencies may be selected as combined or bonded channels to provide thereby additional bandwidth for higher speed traffic/applications. The two or more 6 GHz band channels/frequencies may be (preferably) spectrally contiguous or spectrally non-contiguous. They may also be of differing sizes (i.e., partial or fragmentary 6 GHz band channels/frequencies). For example, when there is a higher speed needed, more than one channel (i.e., a wider band) needs to be selected (e.g., 2, 4 channels for 40 or 80 MHz or even multiple bands for 160 MHz). In this situation, selected channel(s) overlapping with a neighboring deployment may happen more frequently in a dense deployment area (e.g., in a city office or a shopping mall). In this case the quality or quantity of the selected channels or portions thereof may be based on a required bandwidth, as well as indicators such as signal quality (signal strength), SINR or I/N (signal vs noise).

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like. It will be appreciated that the term "or" as used herein refers to a non-exclusive "or," unless otherwise indicated (e.g., use of "or else" or "or in the alternative").

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof.

What is claimed is:

1. An automatic frequency coordination (AFC) method for managing frequency grants to a Wi-Fi access point (AP), comprising:
   (1) determining a location of the AP;
   (2) transmitting toward a Federal Communications Commission (FCC) universal licensing system (ULS) a query to identify allocations of any 6 GHz band channels within a geographic region proximate the location;
   (3) responsive to an indication that some of the proximate 6 GHz band channels are allocated, transmitting toward the FCC ULS a query to identify allocations of a subset of the 6 GHz band channels;
   (4) selecting at least one unallocated 6 GHz band channel exhibiting a high quality signal, and transmitting toward a network manager a registration request identifying the location and the at least one unallocated 6 GHz band channel;
   (5) responsive to a registration response indicating that the location is incorrect, updating the location of the AP and repeating steps (2) through (5);
   (6) responsive to a registration response indicating that none of the at least one unallocated 6 GHz band channel may be used by the AP, repeating steps (2) through (6); and
   (7) responsive to a registration response assigning 6 GHz band channel frequencies to the AP, configuring the AP to operate using the assigned 6 GHz band channel frequencies for a predefined amount of time.

2. The AFC method of claim 1, wherein the query is periodically transmitted in accordance with a channel assignment timer to provide thereby periodic verification of allocations of any 6 GHz band channels within a geographic region proximate the location.

3. The AFC method of claim 2, wherein the query is transmitted at least daily.

4. The AFC method of claim 3, wherein the period of the channel assignment timer is reduced in response to an indication of a licensed user updating their usage more frequently than once a day.

5. The AFC method of claim 1, wherein the location is determined in accordance with one of a global positioning system (GPS) receiver included within the network equipment or the AP, and a customer service address.

6. The AFC method of claim 3, wherein the period of the channel assignment timer is reduced in response to an indication of network deployment updating more frequently than once a day.

7. The AFC method of claim 1, wherein the high quality signal comprises a signal having a low interference to noise power (I/N) ratio.

8. The AFC method of claim 1, wherein the high quality signal comprises a signal providing sufficient bandwidth for expected traffic.

9. The AFC method of claim 8, wherein for expected traffic being associated with a bandwidth exceeding an available channel, said selecting of the at least one unallocated 6 GHz band channel comprises selecting a plurality of 6 GHz band channels.

10. The AFC method of claim 8, wherein for expected traffic being associated with a bandwidth exceeding an available channel, said selecting of the at least one unallocated 6 GHz band channel comprises selecting frequencies associated with a plurality of 6 GHz channels.

11. The AFC method of claim 9, wherein the selected plurality of 6 GHz band channels comprise contiguous 6 GHz band channels.

12. The AFC method of claim 9, wherein the selected plurality of 6 GHz band channels comprise 6 GHz band channels across multiple bands.

13. The AFC method of claim 1, wherein the AFC method is executed by the network equipment upon initialization and expiration of the predefined amount of time.

14. The AFC method of claim 1, wherein the predefined amount of time is 24 hours.

15. The AFC method of claim 5, wherein the customer service address is periodically updated by a customer database.

16. The AFC method of claim 1, wherein the FCC ULS comprises a third party mirror of a source FCC ULS.

17. The AFC method of claim 1, wherein the FCC ULS comprises a local mirror of a source FCC ULS.

18. Network equipment used to manage frequency grants to a Wi-Fi access point (AP) at a customer location, the AP configured to provide network services to user equipment (UE) attached thereto, the network equipment comprising processing resources and non-transitory memory resources, the processing resources configured to execute software instructions stored in the non-transitory memory resources to provide thereby an automatic frequency coordination (AFC) method, comprising:
(1) determining a location of the AP;
(2) transmitting toward a Federal Communications Commission (FCC) universal licensing system (ULS) a query to identify allocations of any 6 GHz band channels within a geographic region proximate the determined AP location;
(3) responsive to an indication that some of the proximate 6 GHz band channels are allocated, transmitting toward the FCC ULS a query to identify allocations of a subset of the 6 GHz band channels of the query;
(4) selecting at least one unallocated 6 GHz band channel exhibiting a high quality signal, and transmitting toward a network manager a registration request identifying the determined AP location and the at least one selected channel;
(5) responsive to a registration response indicating that the determined AP location is incorrect, updating the location of the AP and repeating steps (2) through (5);
(6) responsive to a registration response indicating that none of the at least one selected channels may be used by the AP, repeating steps (2) through (6); and
(7) responsive to a registration response assigning 6 GHz band channel frequencies to the AP, configuring the AP to operate using the assigned 6 GHz band channel frequencies for a predefined amount of time.

19. The network equipment of claim 18, wherein the network equipment comprises a gateway device connected to a backhaul network of a network services provider.

20. A computer-implemented unlicensed channel(s) exclusion enforcement method, in a gateway managing an access point (AP) configured to use unlicensed spectrum, the computer-implemented unlicensed channel(s) exlusion enforcement method comprising:
(1) determining a location of the AP;
(2) transmitting toward a Federal Communications Commission (FCC) universal licensing system (ULS) a query to identify allocations of any 6 GHz band channels within a geographic region proximate the determined AP location;
(3) responsive to an indication that some of the proximate 6 GHz band channels are allocated, transmitting toward the FCC ULS a query to identify allocations of a subset of the 6 GHz band channels of the prior query;
(4) selecting at least one unallocated 6 GHz band channel exhibiting a high quality signal, and transmitting toward a network manager a registration request identifying the determined AP location and the at least one selected channel;
(5) responsive to a registration response indicating that the determined AP location is incorrect, updating the location of the AP and repeating steps (2) through (5);
(6) responsive to a registration response indicating that none of the at least one selected channels may be used by the AP, repeating steps (2) through (6); and
(7) responsive to a registration response assigning 6 GHz band channel frequencies to the AP, configuring the AP to operate using the assigned 6 GHz band channel frequencies for a predefined amount of time.

* * * * *